United States Patent [19]

Ward

[11] Patent Number: 4,839,025

[45] Date of Patent: Jun. 13, 1989

[54] MILD HYDROCRACKING WITH A CATALYST CONTAINING NON-HYDROLYZABLE HALOGEN

[75] Inventor: John W. Ward, Yorba Linda, Calif.

[73] Assignee: Union Oil Company of California, Los Angeles, Calif.

[21] Appl. No.: 61,045

[22] Filed: Jun. 15, 1987

Related U.S. Application Data

[60] Continuation of Ser. No. 711,452, Mar. 13, 1985, abandoned, which is a continuation-in-part of Ser. No. 531,924, Sep. 13, 1983, Pat. No. 4,517,074, which is a division of Ser. No. 84,761, Oct. 15, 1979, Pat. No. 4,419,271.

[51] Int. Cl.$^4$ ............................................. C10G 47/20
[52] U.S. Cl. ................................. 208/111; 208/216 R; 208/254 H
[58] Field of Search ................ 208/111, 216 R, 254 H

[56] References Cited

U.S. PATENT DOCUMENTS

| | | | |
|---|---|---|---|
| 3,159,569 | 12/1964 | Hansford | 208/110 |
| 3,316,169 | 4/1967 | Peck et al. | 208/111 |
| 3,477,965 | 11/1969 | Fishel | 252/442 |
| 3,542,671 | 11/1970 | Pollitzer | 208/136 |
| 3,630,965 | 12/1971 | Voorhies, Jr. et al. | 252/442 |
| 3,702,312 | 11/1972 | Wilson et al. | 252/442 |
| 3,725,244 | 4/1973 | Schutt | 208/59 |
| 4,036,739 | 7/1977 | Ward | 208/120 |
| 4,097,365 | 6/1978 | Ward | 208/111 |
| 4,198,320 | 4/1980 | Chester et al. | 208/120 X |
| 4,297,335 | 10/1981 | Lok et al. | 423/328 |
| 4,390,414 | 6/1983 | Cody | 208/111 |
| 4,401,556 | 8/1983 | Bezman et al. | 208/111 |
| 4,419,271 | 12/1983 | Ward | 502/65 |
| 4,420,388 | 12/1983 | Bertolacini et al. | 208/112 |
| 4,427,786 | 1/1984 | Miale et al. | 502/61 |
| 4,427,787 | 1/1984 | Miale et al. | 502/71 |
| 4,427,788 | 1/1984 | Miale et al. | 502/71 |
| 4,427,789 | 1/1984 | Miale et al. | 502/71 |
| 4,427,790 | 1/1984 | Miale et al. | 502/71 |
| 4,427,791 | 1/1984 | Miale et al. | 502/203 |
| 4,428,825 | 1/1984 | Ward et al. | 208/109 |
| 4,428,862 | 1/1984 | Ward et al. | 502/77 |
| 4,431,516 | 2/1984 | Baird et al. | 208/111 |
| 4,431,517 | 2/1984 | Nevitt et al. | 208/111 |
| 4,431,527 | 2/1984 | Miller et al. | 208/254 |
| 4,443,329 | 4/1984 | Eberly, Jr. et al. | 208/111 |
| 4,494,738 | 4/1984 | Suzuki et al. | 423/329 |
| 4,569,833 | 2/1986 | Gortsema et al. | 423/305 |

FOREIGN PATENT DOCUMENTS

| | | | |
|---|---|---|---|
| 0094827 | 11/1983 | European Pat. Off. | 208/110 |
| 88858 | 1/1981 | Japan. | |
| 0204231 | 12/1982 | Japan | 502/64 |
| 0137435 | 7/1985 | Japan | 502/61 |

*Primary Examiner*—Olik Chaudhuri
*Attorney, Agent, or Firm*—Alan H. Thompson; Gregory F. Wirzbicki

[57] ABSTRACT

A catalyst containing a non-hydrolyzable halogen component is employed to mildly hydrocrack a hydrocarbon oil.

42 Claims, No Drawings

MILD HYDROCRACKING WITH A CATALYST CONTAINING NON-HYDROLYZABLE HALOGEN

RELATED APPLICATIONS

This application is a continuation of application Ser. No. 711,452, filed Mar. 13, 1985, now abandoned, which is a continuation-in-part of U.S. application Ser. No. 531 924 filed Sept. 13, 1983, now U.S. Pat. No. 4,517,074, which is a divisional application of U.S. application Ser. No. 84, 761, filed Oct. 15, 1979, and now U.S. Pat. No. 4,419,271.

BACKGROUND OF THE INVENTION

The invention relates to a process for mild hydrocracking hydrocarbon oils. More particularly, the invention relates to a catalytic process for increasing the yield of middle distillate products from vacuum gas oils and residuum hydrocarbon feedstocks.

In the refining of hydrocarbon oils, it is often desirable to subject the hydrocarbon oil to catalytic hydroprocessing. During hydroprocessing, particulate catalysts are utilized to promote reactions such as hydrocracking, hydrodesulfurization, hydrodenitrogenation, hydrodemetallization and/or conversion of asphaltene compounds. One or more of such reactions may occur during hydroprocessing by contacting a particulate catalyst with a feedstock, such as a residual petroleum oil fraction or a vacuum gas oil, under conditions of elevated temperature and pressure and in the presence of hydrogen. For example, the sulfur components in the feedstock may be converted to hydrogen sulfide, nitrogen components to ammonia, asphaltenes to molecules having increased hydrogen to carbon (H/C) ratios, higher molecular weight hydrocarbons to lower molecular weight hydrocarbons and contaminant metal components to components capable of being deposited on the catalyst Hydrocracking is typically employed in the conversion of higher molecular weight hydrocarbons to lower molecular weight hydrocarbons to convert portions of a feedstock to lighter middle distillate products, such as gasoline and diesel oils.

Refiners of hydrocarbon oils are continually challenged to convert a greater portion of the oil into lighter middle distillate products. A number of conventional conversion processes are commonly used to tackle the conversion problem. Such processes include fluid catalytic cracking, hydrocracking and coking, which all require high capital investments in the refineries, and their construction may take years to be accomplished. Because of such high costs, refiners are continually searching for conversion processes which may be utilized in existing refinery units. One such alternative process for increasing a refinery's capacity to convert feedstocks to middle distillate products is "mild hydrocracking" in existing refinery units. Such a process involves more severely hydroprocessing a feedstock to obtain increased percentages of middle distillate products while operating within the constraints of the existing refinery equipment. One of the challenges to the refiner is to discover a catalyst which will suitably perform within the design limits of the existing hydroprocessing unit. For example, a mild hydrocracking catalyst utilized in a unit formerly used for vacuum gas oil desulfurization or residuum hydrodesulfurization (i.e. a unit formerly used for less than about 10 volume percent hydrocarbon conversion) must exhibit acceptable activity, selectivity and stability, under the limiting operating conditions of the existing unit.

Therefore, an aim of the art is to provide a mild hydrocracking catalyst having a high activity, selectivity and stability. Activity may be determined by comparing the temperature at which various catalysts must be utilized under otherwise constant mild hydrocracking conditions with the same feedstock so as to produce a given percentage (between 10 percent and 50 volume percent) of products boiling at or below 700° F. The lower activity temperature for a given catalyst, the more active such a catalyst is in relation to a catalyst of higher activity temperature. Alternatively, activity may be determined by comparing the percentages of products boiling at or below 700° F. when various catalysts are utilized under otherwise constant mild hydrocracking conditions with the same feedstock. The higher the percentage of 700° F.- minus product converted from the components in the feedstock boiling above 700° F. for a given catalyst, the more active such a catalyst is in relation to a catalyst yielding a lower percentage of 700° F.- minus product. Selectivity of a mild hydrocracking catalyst may be determined during the foregoing described activity test and is measured as that percentage fraction of the 700° F.-minus product boiling in the range of middle distillate or midbarrel products, i.e., 300° F.-700° F. Stability is a measure of how well a catalyst maintains its activity over an extended time period when treating a given hydrocarbon feedstock under the conditions of the activity test. Stability is generally measured in terms of the change in temperature required per day to maintain a 40 volume percent or other given conversion (less than 50 volume percent).

A typical mild hydrocracking catalyst contains hydrogenation metals on a porous refractory oxide support. Hydrogenation metals usually include Group VIB and/or Group VIII active metal components supported on an amorphous refractory oxide support such as alumina. The catalyst may also contain one or more acidifying components. Despite the high mild hydrocracking activity of the catalysts of the prior art, catalysts of yet higher activity, selectivity and stability are still being sought.

A problem with mild hydrocracking catalysts containing acidifying components is the hydrolysis of such components either prior to or during processing of the hydrocarbon. Hydrolysis results in the loss of the acidifying component from the catalyst and consequently the catalyst activity is decreased. Also, as the lost acidic materials from the catalyst pass downstream, the refinery metallurgy may be attacked and damaged by corrosion.

Accordingly, it is a major object of this invention to provide a mild hydrocracking process utilizing a catalyst having non-hydrolyzable acidifying components, and more particularly to provide a mild hydrocracking process utilizing a catalyst containing a non-hydrolyzable acidifying component in existing refinery units to convert about 10 to about 50 volume percent of a hydrocarbon oil boiling above 700° F. to middle distillate oils boiling at or below 700° F.

It is a further object of the invention to provide a catalytic mild hydrocracking process for a hydrocarbon feedstock wherein the catalyst contains a support matrix having a dispersion of amorphous refractory oxides further interspersed with non-hydrolyzable acidifying components.

Another object of the invention is to provide a process for removing organo-nitrogen and/or organo-sulfur compounds from a residuum hydrocarbon oil or vacuum gas oil by contacting the oil with a catalyst having non-hydrolyzable acidifying components and simultaneously converting about 10 to about 50 volume percent of the oil boiling above about 700° F. to middle distillate oils boiling at or below 700° F.

These and other objects and advantages of the invention will become apparent from the following description.

SUMMARY OF THE INVENTION

The invention relates to a mild hydrocracking process promoted by a catalyst containing at least one non-hydrolyzable halogen component. The catalyst contains at least one active metal component on a support material containing at least one non-hydrolyzable halogen component. In one embodiment, the mild hydrocracking process is promoted with a catalyst prepared with a catalytic component, such as a zeolite, that is first contacted with a gaseous mixture containing at least one halogen gas and thereafter incorporated with an amorphous support matrix, preferably containing a dispersion of silica-alumina cracking component in an alumina matrix. In another embodiment, a vacuum gas hydrocarbon oil is hydrocracked, desulfurized and denitrogenated by contact with a catalyst containing at least one non-hydrolyzable fluorine component under mild hydrocracking conditions which have been correlated so as to give about 10 to about 50 volume percent conversion of the oil fraction boiling above 700° F. to hydrocarbon products boiling at or below about 700° F.

DETAILED DESCRIPTION OF THE INVENTION

The invention is directed to a mild hydrocracking process promoted by a catalyst comprising active metals on a support material containing a non-hydrolyzable halogenated catalytic component. The catalyst preferably comprises both Group VIII and VIB active metal components on a support material comprising at least one non-hydrolyzable halogenated catalytic component, such as a fluorinated zeolite, interspersed with an amorphous refractory oxide, and preferably interspersed with a dispersion of silica-alumina in an alumina matrix. The process of the invention is particularly well suited for mild hydrocracking wherein the desired result is hydrocracking coupled with a suitable degree of hydrodenitrogenation and/or hydrodesulfurization of a hydrocarbon oil containing a relatively high content of nitrogen and sulfur.

As defined herein, a catalyst containing a "non-hydrolyzable" halogen component contains the halogen in a form such that not more than 20 weight percent thereof is lost after being subjected to a gas stream containing 15 volume percent of steam and the balance nitrogen for 15 hours at 400° C. A test for determining whether the halogen component is non-hydrolyzable is as follows: (1) into a quartz tube with glass wool plugs is placed 100 grams of a halogenated catalyst having a determined weight percent of halogen and connected to the tube is a source of steam diluted to 15 volume percent in a nitrogen gas carrier, (2) the tube is placed in a tube furnace at ambient (room) temperature, i.e. 25° C., and heated at 50° C./hour to 400° C. while the steam/nitrogen gas flow is maintained at 10 scf/hour, (3) the steam/nitrogen gas flow and the tube is maintained at 400° C. for 15 hours and then the steam is suspended and the catalyst cooled to room temperature in a nitrogen atmosphere, (4) the remaining weight percent of the halogen in the treated halogenated catalyst sample is determined by conventional methods, such as potentiometric measurements utilizing specific halogen-sensitive electrodes (i.e., for example, chlorine-sensitive electrode for chlorine detection and fluorine-sensitive electrode for fluorine detection) and, (5) the weight percent of the halogen in the catalyst starting material in step (1) is compared with that in the treated material in step (4). Such a test can readily determine whether less than 20 weight percent of the halogen, on a dry weight basis, is lost from the halogenated catalyst sample during steam treatment.

The catalyst employed in the mild hydrocracking process of the invention contains at least one active metal component on a support material containing at least one non-hydrolyzable halogen component. The halogen component usually selected for use in the invention is chosen from the group consisting of fluorine and chlorine, with fluorine the more highly preferred. Typically, the catalyst contains about 0.01 to about 10, and preferably about 0.1 to about 5 weight percent of the halogen component, calculated as the monoatomic element.

The support material typically contains a catalytic component containing the non-hydrolyzable halogen component. Catalytic components useful in the present catalysts are natural and synthetically prepared crystalline or amorphous aluminosilicates, including zeolites, inorganic refractory oxides and their modifications. Amorphous support components include, but are not limited to, amorphous, coprecipitated silica-alumina, silica-titania, alumina-titania, silica-zirconia, and the like. Zeolites contained in the support material include erionite, mordenite, zeolite omega, zeolite beta, zeolite Y, ZSM-5, ZSM-11, ZSM-12, ZSM-35, and zeolite L. Molecular sieves are also useful among which are included not only many crystalline zeolites but such non-zeolite materials as silicalite, crystalline aluminophosphate (as disclosed in U.S. Pat. No. 4,310,440), crystalline silicoaluminophosphate (disclosed in U.S. Pat. No. 4,440,871) and crystalline ferrosilicate (disclosed in EPO publication No. 0 115 031). However, the preferred catalytic components are crystalline zeolites, especially zeolite X and zeolite Y, and their stabilized derivatives. A highly preferred catalytic component is a steam stabilized zeolite Y, disclosed in U. S. Pat. No. 4,036,739, incorporated by reference herein in its entirety. A most highly preferred catalytic component is a modified zeolite Y, disclosed in samples A through F, of Table II, in U.S. Pat. No.4,297,335, issued to Lok et al., which patent is herein incorporated by reference in its entirety.

Ordinarily, a crystalline zeolitic aluminosilicate having a $SiO_2/Al_2O_3$ molar ratio of at least 2, preferably in the range from about 2 to about 100 is preferred, especially those zeolites having at least 50, and preferably, at least 90 percent of the framework aluminum atoms not associated with metal ions.

A catalyst containing a non-hydrolyzable halogen component frequently exhibits high hydrophobicity and essentially no halogen loss during mild hydrocracking of a hydrocarbon oil. A preferred method for preparing such a catalyst is to contact a catalytic component, such as a zeolite active for cracking reactions, with an elemental halogen-containing gas, preferably a gas mixture comprising a halogen (preferably elemental fluorine), an inert gas (preferably nitrogen), and optionally oxygen. Ordinarily, the gas mixture contains at least about 0.05 volume percent, and preferably about 0.1 to about 20 volume percent of elemental halogen, up to about 21 volume percent of oxygen and the remainder one or a mixture of inert gases, preferably nitrogen. The catalytic component is typically contacted with the halogen at a temperature above about 50° F. for at least 1 minute and the resulting halogenated material can be further treated by calcination at temperatures up to the destruction temperature of the catalytic component. The resulting halogenated catalytic component has enhanced hydrophobicity properties, and the halogen is essentially non-hydrolyzable. It is highly preferred that a halogenated zeolite be prepared in the same or similar manner as the halogenated zeolite prepared in accordance with the disclosure in U.S. Pat. No. 4,297,335 issued to Lok et al.

Preferably, the zeolite or other catalytic component containing non-hydrolyzable halogen components is dispersed by admixture into a support matrix material, typically non-zeolitic amorphous refractory oxides, to form a support material suitable for use in the invention. The support material typically comprises about 5 to about 95 weight percent, preferably about 10 to about 90 weight percent, and most preferably about 15 to about 85 weight of the halogenated zeolite or other halogenated catalytic component. Usually, the amorphous matrix comprises at least about 15 weight percent of the support material with the preferred and most preferred proportions being in the respective ranges of 30 to 98 and 30 to 90 weight percent of the support. In a most highly preferred embodiment, about 15 to about 50 weight percent of the admixture comprises a halogenated catalytic component.

The amorphous matrix portion of the support material usually contains essentially no hydrolyzable halogen component. Typical support matrix compositions are selected from amorphous refractory oxides such as silica, magnesia, silica-magnesia, zirconia, silica-zirconia, titania, silica-titania, etc. Mixtures of the foregoing oxides are also contemplated, especially when prepared as homogeneously as possible. A preferred refractory oxide material, however, comprises aluminum and is usually selected from the group consisting of alumina, lithium-alumina, phosphorus-alumina, lithium-phosphorus-alumina, and silica-alumina. Transition aluminas such as gamma alumina, eta alumina, delta alumina and theta alumina are highly preferred refractory oxides. Typically a binding material, such as Catapal TM, is admixed with the amorphous matrix material and the halogenated catalytic component.

In a highly preferred embodiment in which the support material is used to prepare a catalyst effective for mild hydrocracking, the amorphous matrix portion of the support contains a dispersion of silica-alumina in a matrix containing alumina, such dispersions are described in U.S. Pat. Nos. 4,097,365 and 4,419,271, both of which are herein incorporated by reference in their entireties. One convenient method for preparing the amorphous matrix portion the support herein is to comull an alumina hydrogel with a silica-alumina cogel in hydrous or dry form. The cogel is preferably homogeneous and may be prepared in a manner such as that described in U.S. Pat. No. 3,210,294. Alternatively, the alumina hydrogel may be comulled with a "graft copolymer" of silica and alumina that has been prepared, for example, by first impregnating a silica hydrogel with an alumina salt and then precipitating alumina gel in the pores of the silica hydrogel by contact with ammonium hydroxide. In the usual case, the cogel or copolymer (either of which usually comprises silica in a proportion by dry weight of 20 to 96 percent, preferably 50 to 90 percent) is mulled with the alumina hydrogel such that the cogel or copolymer comprises 5 to 75 weight percent, preferably 20 to 65 weight percent, of the mixture. The overall silica content of the resulting dispersion on a dry basis is usually between 1 and 75 weight percent, preferably between 10 and 60 weight percent.

The halogenated catalytic component/amorphous matrix support material is usually prepared in the form of shaped particulates by methods well known in the art, with the preferred method being to extrude a precursor of the desired support through a die having openings therein of desired size and shape, after which the extruded matter is cut into extrudates of desired length. The halogenated catalytic component/amorphous matrix support particles may also be prepared by mulling (or pulverizing) a precalcined amorphous refractory oxide (typically an alumina gel or hydrated alumina calcined above about 900° F. is converted to gamma alumina or other forms of alumina) to a particle size less than about 100 microns and then admixing therewith a halogenated zeolite, prepared as disclosed herein. In the highly preferred embodiment in which the amorphous matrix portion of the support contains a dispersion of silica-alumina in a matrix containing alumina, a mulled mixture of alumina gel with either a silica-alumina cogel or a silica and alumina "graft copolymer" may be utilized in the gel form or may be dried and/or calcined prior to combination with the halogenated catalytic component. In the preferred method of preparation, the cogel or copolymer is spray dried and then crushed to a powdered form, following which the powder is mulled with a powder containing halogenated catalytic components, or precursors thereof. The amounts of cogel or copolymer mulled with the halogenated catalytic component are such that the support will ultimately contain the halogenated catalytic component and dispersion in the proportions set forth hereinbefore. If the amorphous matrix support is not capable of sufficiently binding with the catalytic component, a suitable binder, such as peptized Catapal TM alumina, may be employed prior to extrusion.

The extruded particles may have any cross-sectional shape and often have a symmetrical cross-sectional shape, preferably a cylindrical or polylobal shape. The cross-sectional diameter of the particles is usually about 1/40 to about ⅛ inch, preferably about 1/32 to about 1/12 inch, and most preferably about 1/24 to about 1/15 inch. Among the preferred catalyst configurations, at least for mild hydrocracking, are those having cross-sectional shapes resembling that of a three-leaf clover, as shown, for example, in FIGS. 8 and 8A of U.S. Pat. No. 4,028,227. Preferred clover-shaped particulates are such that each "leaf" of the cross-section is defined by about a 270° arc of a circle having a diameter between about 0.02 and 0.05 inch. Other preferred particulates are those having quadralobal cross-sectional shapes, as in FIG. 10 of U.S. Pat. No. 4,028,227, including when the lobes are assymetrical.

Characteristics of the halogenated catalytic component/amorphous matrix supports utilized herein include a total pore volume, average pore diameter and surface area large enough to provide substantial space and area to deposit the active metal components. The total pore volume the support, as measured by conventional mercury porosimeter methods, is usually about 0.2 to about 2.0 cc/gram, preferably about 0.4 to about 1.5 cc/gram, and most preferably about 0.5 to about 0.9 cc/gram.

To prepare the mild hydrocracking catalyst, the support material is compounded, as by impregnation of the calcined catalytic component/amorphous matrix support particles, with one or more precursors of at least one catalytically active metal component. The impregnation may be accomplished by any method known in the art, as for example, by spray impregnation wherein a solution containing the metal precursors in dissolved form is sprayed onto the support particles. Another method is the circulation or multi-dip procedure wherein the support material is repeatedly contacted with the impregnating solution with or without intermittent drying. Yet another method involves soaking the support in a large volume of the impregnation solution, and yet one more method is the pore volume or pore saturation technique wherein support particles are introduced into an impregnation solution of volume just sufficient to fill the pores of the support. On occasion, the pore saturation technique may be modified so as to utilize an impregnation solution having a volume between 10 percent less and 10 percent more than that which will just fill the pores.

If the active metal precursors are incorporated by impregnation, a subsequent or second calcination, as for example at temperatures between 750° F. and 1400° F., converts the metals to their respective oxide forms. In some cases, calcinations may follow each impregnation of individual active metals. Such multiple impregnation-calcination procedures, however, may be avoided in alternative embodiments of the invention, as for example, by comulling all the active metals with the support materials rather than impregnating the metals thereon. In comulling, precursors of the support materials, usually a mixture including the halogenated catalytic component and the amorphous matrix in a hydrated or gel form, are admixed with precursors of the active metal components, either in solid form or in solution, to produce a paste suitable for shaping by known methods, e.g., pelleting, extrusion, etc. A single, subsequent calcination yields a mild hydrocracking catalyst containing the active metals in their respective oxide forms.

When the mild hydrocracking catalyst is prepared by the foregoing or equivalent methods, at least one active metal component is selected as a hydrogenation metal, typically from the Group VIB and VIII metals of the Periodic Table of Elements Preferably, the catalyst contains both a Group VIB and VIII element as hydrogenation metals, with cobalt or nickel and molybdenum or tungsten being the most preferred combination of active metals. The catalyst contains up to about 10, usually from 1 to 8 percent, and preferably from 2 to 6 percent by weight of the Group VIII metal, calculated as the monoxide, and up to about 30, usually from about 3 to about 28 percent, and preferably from 8 to 26 percent by weight of the Group VIB metal, calculated as the trioxide.

A highly preferred catalyst useful herein contains about 5 to about 30 weight percent of Group VIB metal components, calculated as the trioxide, and from about 0.5 to about 8 weight percent of Group VIII metal components, calculated as the monoxide, on a support containing a zeolite, such as the zeolites disclosed in U.S. Pat. Nos. 4,036,739 and 4,297,335, containing a non-hydrolyzable halogen component interspersed with a refractory oxide matrix containing gamma alumina. The most preferred Group VIII and Group VIB metals in this embodiment are cobalt or nickel and molybdenum or tungsten, respectively. The most preferred refractory oxide matrix contains a dispersion of about 5 to about 75 weight percent of silica-alumina in the alumina matrix.

Catalysts are activated in accordance with methods suited to a mild hydrocracking process. Most of the catalysts used in the mild hydrocracking process of the invention are more active, sometimes even far more active, in a sulfided form than in the oxide form in which they are generally prepared. Accordingly, the catalyst used herein may be sulfided prior to use (in which case the procedure is catalyst prepared in the calcined form. Temperatures between 300° F. and 700° F. and gaseous space velocities between about 140 and 500 v/v/hr are generally employed, and this treatment is usually continued for at least about two hours. A mixture of hydrogen and one or more components selected from the group consisting of sulfur vapor and the sulfur compounds (e.g., lower molecular weight thiols, organic sulfides, and especially $H_2S$) is suitable for pre-sulfiding. Generally speaking, the relative proportion of hydrogen in the presulfiding mixture is not critical, with any proportion of hydrogen ranging between 1 and 99 percent by volume being adequate. Also, liquid sulfiding agents, such as dimethyl disulfide and the like, may be used for presulfiding.

If the catalyst is to be used in a sulfided form, it is preferred that a presulfiding procedure be employed. However, since mild hydrocracking processes result in the upgrading of sulfur-containing hydrocarbons (i.e. hydrodesulfurization), one may, as an alternative, accomplish the sulfiding in situ, particularly with hydrocarbon oils containing about 1.0 weight percent or more of sulfur under mild hydrocracking conditions.

Water is typically produced during the sulfiding (pre-sulfiding or in situ) of oxygen-containing calcined catalysts. An advantage of the process of the invention is that the halogen component contained in the catalytic component of the catalyst support undergoes essentially no hydrolysis upon contact with such water, during presulfiding or during mild hydrocracking. Additionally, the halogenated catalytic component is not hydrolyzed by ammonia or other typical reactants and products involved in the mild hydrocracking of the hydrocarbon feedstock. The lack of susceptibility of the catalyst to hydrolysis of the halogen component in the catalytic component effects essentially no significant loss of the halogen component from the catalyst. Since such little, if any, halogen is lost from the catalyst, any lost halogen causes minor damage to refinery metallurgy, such as the reactor unit or downstream refining equipment.

A mild hydrocracking catalyst of desired chemical and physical characteristics may be employed as either a fixed, slurried or fluidized bed, (but most usually a fixed bed) of particulates in a suitable reactor vessel wherein a hydrocarbon oil to be treated is introduced and subjected to mild hydrocraking conditions including an elevated total pressure, temperature, and hydrogen partial pressure. Under such conditions, the hydrocarbon oil and catalyst are subjected to a hydrogen partial pressure usually less than 2,500 p.s.i.g. (frequently less than about 1,200 p.s.i.g. for vacuum gas oil mild hydrocracking) at a space velocity usually less than 3.0 LHSV so as to effect the desired degree of hydrocracking, desulfurization, and denitrogenation. As used herein, mild hydrocracking conditions require the conversion of about 10 to about 50, and preferably, about 15 to about 35 volume percent of the feedstock hydrocarbons boiling above about 700° F. to products boiling at or below 700° F. from a single pass of the feedstock in contact with the catalyst. The selectivity of the catalyst is determined by the fraction of the 700° F.- minus product which boils in the range from about 300° F. to about 700° F.

Contemplated for treatment by the process of the invention are hydrocarbon-containing oils, herein referred to generally as "hydrocarbon oils," including broadly all liquid and liquid/vapor hydrocarbon mixtures such as crude petroleum oils and synthetic crudes. Among the typical oils contemplated are top crudes, vacuum and atmospheric residual fractions, light and heavy atmospheric and vacuum distillate oils, shale oils, oils from bituminous sands, coal compositions and the like. For use herein, typical hydrocarbon oils, or mixtures thereof, contain at least about 50 volume percent of components normally boiling above about 700° F. and/or a pour point usually greater than about 40° F.

Although virtually any hydrocarbon feedstock containing undesirable proportions of sulfur and nitrogen may be treated by mild hydrocracking, the process is particularly suited to treating (1) gas oils, preferably light and heavy vacuum gas oils and waxy shale oils, and (2) heavy residual fractions, especially the treated atmospheric and vacuum residuum oils containing less than about 25 ppmw of contaminant metals (vanadium, nickel, and the like). Sulfur is usually present in such oils in a proportion exceeding 0.1 weight percent and often exceeding 1.0 weight percent. Frequently, the feedstock contains undesirable proportions of nitrogen, usually in a concentration greater than about 0.01 weight percent and often between about 0.01 and 1.0 weight percent. The feedstock may contain waxy components, e.g., n-paraffins and isoparaffins, in amounts to exhibit pour points of at least about 30° F.

A hydroprocessing reactor useful in the mild hydrocracking process of the invention is ordinarily an existing reactor that is part of an existing hydroprocessing unit, or units, in a refinery. A preferred reactor is one formally used for vacuum gas oil desulfurization. In the mild hydrocracking of such a gas oil, the catalyst is usually maintained as a fixed bed with the feedstock passing downwardly once therethrough, and the reactor is generally operated under conditions within the limits of the existing reactor design. In some instances, mild hydrocracking reactors may be added to the existing equipment, either in series or parallel. Typical operating conditions that yield more than about 10 volume percent conversion of the oil fraction boiling above 700° F. to liquid products boiling at or below 700° F. are shown in the following Table I:

TABLE I

| Operating Conditions | Suitable Range | Preferred Range |
| --- | --- | --- |
| Temperature, °F. | 500-900 | 600-850 |
| Hydrogen Pressure, p.s.i.g. | 200-1,500 | 500-1,300 |
| Space Velocity, LHSV | 0.05-3.0 | 0.1-1.5 |
| Hydrogen Recycle Rate, scf/bbl | 500-15,000 | 1000-10,000 |

Another preferred reactor utilized in the process of the invention is a hydrodesulfurization reactor formerly used for processing a hydrocarbon residuum feedstock. Ordinarily, this reactor is in the latter stage, or stages, of a multi-stage unit for hydrodesulfurization and/or demetallization of a residuum-containing feedstock. In the case of mild hydrocracking a residuum feedstock, the total hydrogen pressure is usually higher than that during mild hydrocracking a gas oil. In comparision to conventional hydrodesulfurization conditions that yield, from a single pass, less than about 10 volume percent of liquid hydrocarbon products boiling at or below 700° F., the operating conditions of the process of the invention for mild hydrocracking a residuum hydrocarbon typically include an increased temperature and/or decreased space velocity.

The results obtained in any particular mild hydrocracking process will depend upon the nature of the catalyst, the nature of the feedstock, and the severity of the operating conditions. Also, it is highly preferred that about 15 to about 30 volume percent of the oil is converted, in a single pass, to liquid products boiling at or below 700° F., and that at least about 85 volume percent of the 700° F. minus fraction contain liquid hydrocarbon products boiling in the midbarrel range from about 300° F. to about 700° F. In the case of hydrodewaxing, the pour point of the product is usually reduced to less than 30° F., and preferably less than 25° F.

The invention is further illustrated by the following examples which are illustrative of specific modes of practicing the invention and are not intended as limiting the scope of the invention defined by the appended claims.

EXAMPLE I

A catalyst, designated as Catalyst MH, is prepared in accordance with the invention.

Catalyst MH is prepared as follows: 55 parts of a cogel of silica-alumina containing 75 weight percent of silica ($SiO_2$) and 25 weight percent of alumina ($Al_2O_3$) is intimately admixed with 45 parts of an alumina powder such that the overall silica ($SiO_2$) is 48 weight percent of the mixture. The mixture is then mixed with a dry fluorinated Type-Y zeolite and Catapal TM alumina and then mulled for 20 minutes. The fluorinated Type-Y zeolite is prepared in a similar manner as Sample D in Table II of the aforementioned Lok et al. patent, and contains about 0.25 weight percent of fluorine, calculated as F. (Samples of the fluorinated type-Y zeolite used herein contain 0.21 weight percent of fluorine after being subjected to the "non-hydrolyzable test" as disclosed herein, i.e., lost approximately 16 weight percent of fluorine.)

Water is mixed with the mixture of silica-alumina in alumina, fluorinated zeolite, and Catapal TM alumina for 30 minutes to form an extrudable paste. The paste is extruded through a die producing 1/16 inch cross-sectioned cloverleaf extruded matter, which, after being broken into extrudates of about 0.1 and 0.6 inch lengths, is oven dried at 110° C. for 2 hours and calcined at 900° F. for 2 hours. The calcined silica-alumina/alumina/-fluorinated zeolite support particle extrudates contain 40 weight percent of zeolite, 40 weight percent of silica-alumina/alumina and 20 weight percent of Catapal TM.

The silica-alumina/alumina/fluorinated zeolite support particles are impregnated with an impregnant solution containing 100 grams of ammonium metatungstate (91 weight percent $WO_3$) and 72 grams of nickel nitrate

[Ni (NO$_3$)$_2$ . 6H$_2$O]. After impregnation, the catalyst is dried at 110° C. and calcined at 900° F. for 2 hours in flowing air. A final catalyst is produced having a nominal composition as follows: 22.0 weight percent of tungsten components, calculated as WO$_3$, 4.0 weight percent of nickel components, calculated as NiO, with the balance comprising the silica-alumina/alumina/-fluorinated zeolite/Catapal TM alumina support.

Catalyst MH is tested under mild hydrocracking conditions to determine its hydrocracking activity and selectivity and its denitrogenation and desulfurization activity against two comparison catalysts in comparative processes.

Catalyst MZ is prepared in a similar manner as catalyst MH, except the zeolite material contains no fluorine or other halogen component. Catalyst MZ has essentially the same metals loading (22.0 weight percent of tungsten components, calculated as WO$_3$, 4.0 weight percent of nickel components, calculated as NiO) and physical characteristics (including silica-alumina/zeolite weight ratio) as catalyst MH.

Catalyst C is a commercially available catalyst useful for mild hydrocracking and contains about 20.0 weight percent of molybdenum components, calculated as MoO$_3$, about 5.0 weight percent of cobalt components, calculated as CoO, about 3.0 weight percent of phosphorus components, calculated as P, and the balance of gamma alumina. Catalyst MH and the two comparison catalysts are each presulfided for about 16 to about 20 hours by contact with a gas consisting of 90 volume percent H$_2$ and 10 volume percent H$_2$S flowing at 4.4 SCFH (one atmosphere pressure). The temperature during the presulfiding is initially at room temperature, is increased gradually until 700° F. is reached, and then lowered to 550° F., at which time the catalyst is contacted with the feedstock.

Catalyst MH and comparison catalysts MZ and C are tested at mild hydrocracking conditions to determine activity and selectivity with a Light Arabian vacuum gas oil (VGO) feedstock having the characteristics shown in Table II below. Table II also includes hydrodenitrogenation and hydrodesulfurization activity. The presulfided catalysts, MH and the comparisions, are each charged in separate runs to a reactor and utilized at 710° F. for 3 days, at 735° F. for 2 days, and at 755° F. for the next 2 days to hydrocrack, hydrodesulfurize and hydrodenitrogenate the VGO feedstock under the following conditions: 1,000 p.s.i.g. total pressure, 1.0 LHSV and a hydrogen rate of 3,000 SCF/B.

TABLE II

| Feedstock Properties | |
|---|---|
| Feed Description | Light Arabian Vacuum Gas Oil |
| Gravity, °API | 22.3 |
| Sulfur, wt. % | 2.54 |
| Nitrogen, wt. % | 0.09 |
| Carbon Residue, D-189, wt. % | 0.42 |
| Pour Point, °F. | +95 |

TABLE II-continued

| Feedstock Properties | |
|---|---|
| ASTM D-1160, Vol % | Distillation, °F. |
| IBP/5 | 623/700 |
| 10/20 | 737/776 |
| 30/40 | 810/837 |
| 50/60 | 860/898 |
| 70/80 | 928/968 |
| 90/95 | 1019/1056 |
| EP/% rec | 1103 |

A portion of the feedstock is passed downwardly through each reactor and contacted with the described catalysts in a single stage, single pass system with once-through hydrogen. The data relating to conversion of nitrogen and sulfur compounds and conversion to 700? F. minus products is summarized in Table III.

TABLE III

| Catalyst | Product Vol % Boiling at or Below 700° F. | | | Wt. % Product S | | | Wt. % Product N | | |
|---|---|---|---|---|---|---|---|---|---|
| Temp, °F. | 710 | 735 | 755 | 710 | 735 | 755 | 710 | 735 | 755 |
| MH | 22.7 | 30.7 | 42.7* | .51 | .253 | .117 | .039 | .023 | .011 |
| MZ | 20.4 | — | 40.9** | .55 | — | .140 | .039 | — | .008 |
| C | 20.5 | 25 | 34 | .12 | .014 | .006 | .021 | .010 | .005 |

*Fraction contains 89 Vol. % boiling in the 300° F. to 700° F. range.
**Fraction contains 87.6 Vol. % boiling in the 300° F. to 700° F. range.

In view of the data in Table III relative to conversion of the feedstock to products boiling at a temperature at or below 700° F., the process of the invention utilizing catalyst MH exhibits noticeably higher yields of products boiling below 700° F. than the comparison catalysts at all three conversion temperatures. Furthermore, the process utilizing catalyst MH selectively produces a greater volume percentage of products boiling between about 300° F. and about 700° F. than the comparative process devoid of a catalyst containing a non-hydrolyzable halogen component.

While particular embodiments of the invention have been described, it will be understood, of course, that the invention is not limited thereto since many obvious modifications can be made, and it is intended to include within this invention any such modifications as will fall within the scope of the invention as defined by the appended claims.

I claim:

1. A process for mild hydrocracking a hydrocarbon oil, said process comprising contacting said hydrocarbon oil under conditions of elevated temperature and pressure with a particulate catalyst comprising at least one active metal component on a support material containing a zeolite having at least one non-hydrolyzable halogen component, said conditions being such as to yield about a 10 to about a 50 volume percent conversion of the hydrocarbon oil fraction boiling above 700° F. to hydrocarbon products boiling at or below 700° F. and wherein at least 85 volume percent of said hydrocarbon products boiling at or below 700° F. boil in the midbarrel range from about 300° F. to about 700° F.

2. The process defined in claim 1 wherein said hydrocarbon oil contains more than 50 volume percent of hydrocarbon components boiling above 700° F., and said halogen component comprises fluorine.

3. The process defined in claim 1 wherein said conditions comprise a hydrogen pressure less than about 1,500 p.s.i.g. and being such as to yield about a 15 to about a 35 volume percent conversion of said hydrocarbon oil boiling about 700° F. to hydrocarbon products boiling at or below 700° F.

4. The process defined in claim 1 wherein said hydrocarbon oil contains nitrogen and said process further comprising simultaneous denitrogenation of said hydrocarbon oil.

5. The process defined in claim 1 wherein said zeolite is selected from the group consisting of erionite, mordenite, zeolite Y, zeolite omega, zeolite beta, zeolite ZSM-5, zeolite ZSM-11, zeolite ZSM12, and zeolite ZSM-35.

6. The process defined in claim 1 wherein said hydrocarbon oil contains sulfur and said process further comprising simultaneous desulfurization of said hydrocarbon oil.

7. The process defined in claim 1 wherein said active metal component is selected from the group consisting of Group VIB and Group VIII metals.

8. The process defined in claim 1 wherein said zeolite comprises zeolite Y and said active metal is selected from the group consisting of cobalt, nickel, molybdenum and tungsten.

9. The process defined in claim 1 wherein said support comprises about 0.01 to about 10 weight percent of fluorine, calculated as F., and said hydrocarbon oil comprises a residuum feedstock or a gas oil.

10. The process defined in claim 1 wherein said hydrocarbon oil is a residuum feedstock and said conditions comprise a temperature sufficient to yield about a 15 to about a 35 volume percent conversion of said hydrocarbon oil to hydrocarbon products boiling at or below 700° F.

11. A process for mild hydrocracking a hydrocarbon oil, said process comprising contacting said hydrocarbon oil under conditions of elevated temperature and pressure with a particulate catalyst comprising at least one active metal component on a support material containing a catalytic component comprising a zeolite having at least one non-hydrolyzable halogen component in intimate admixture with a dispersion of silica-alumina in a matrix containing alumina, said conditions being such as to yield about a 10 to about a 50 volume percent conversion of said hydrocarbon oil boiling above 700° F. to hydrocarbon products boiling at or below 700° F. and wherein at least 85 volume percent of said hydrocarbon products boiling at or below 700° F. boil in the midbarrel range from about 300° F. to about 700° F.

12. The process defined in claim 11 wherein said hydrocarbon oil contains more than 50 volume percent of hydrocarbon components noramlly boiling above 700° F., and said halogen component comprises fluorine.

13. The process defined in claim 11 wherein said conditions comprise a hydrogen pressure less than about 1,300 p.s.i.g.

14. The process defined in claim 11 wherein said hydrocarbon oil contains nitrogen and said process further comprising simultaneous denitrogenation of said hydrocarbon oil.

15. The process defined in claim 11 wherein said zeolite is selected from the group consisting of erionite, mordenite, zeolite Y, zeolite omega, zeolite beta, zeolite ZSM-5, zeolite ZSM-11, zeolite ZSM-12, and zeolite ZSM-35.

16. The process defined in claim 11 wherein said hydrocarbon oil contains sulfur and said process further comprising simultaneous desulfurization of said hydrocarbon oil.

17. The process defined in claim 11 wherein said active metal component is selected from the group consisting of Group VIB and Group VIII metals.

18. The process defined in claim 14 wherein said zeolite comprises zeolite Y and said active metal is selected from the group consisting of cobalt, nickel, molybdenum and tungsten.

19. The process defined in claim 11 wherein said catalytic component comprises about 0.01 to about 10 weight percent of fluorine, calculated as F., and said hydrocarbon oil comprises a residuum feedstock or a gas oil.

20. The process defined in claim 11 wherein said conditions being such as to yield about a 15 to about a 35 volume percent conversion of said hydrocarbon oil boiling above 700° F. to hydrocarbon products boiling at or below 700° F.

21. The process defined in claim 11 wherein said hydrocarbon oil is a residuum feedstock and said conditions comprise a temperature sufficient to yield about a 15 to about a 35 volume percent conversion of said hydrocarbon oil to hydrocarbon products boiling at or below 700° F.

22. The process defined in claim 11 wherein said dispersion of silica-alumina in an alumina matrix comprises between about 5 and about 75 weight percent of silica-alumina.

23. The process defined in claim 11 wherein said support material comprises about 5 to about 95 weight percent of said catalytic component, and said active metal is selected from the group consisting of cobalt, nickel, molybdenum and tungsten.

24. A process for mild hydrocracking a hydrocarbon oil containing more than 50 volume percent of hydrocarbon components boiling at greater than 700° F., said process comprising contacting said hydrocarbon oil under conditions of elevated temperature and pressure with a catalytic composition comprising at least one active metal component on a support material containing a zeolite having at least one halogen component, said support material prepared by a method comprising contacting said support material with a halogen gas so as to produce a non-hydrolyzable halogen component in said support material, and said conditions being such as to yield about a 10 to about a 50 volume percent conversion of said hydrocarbon oil boiling above 700° F. to hydrocarbon products boiling at or below 700° F. and wherein at least 85 volume percent of said hydrocarbon products boiling at or below 700° F. boil in the midbarrel range from about 300° F. to about 700° F.

25. The process defined in claim 24 wherein said halogen gas is selected from the group consisting of elemental fluorine and elemental chlorine.

26. The process defined in claim 24 wherein said halogen gas comprises elemental fluorine.

27. The process defined in claim 24 wherein said zeolite is selected from the group consisting of erionite, mordenite, zeolite Y, zeolite omega, zeolite beta, zeolite ZSM-5, zeolite ZSM-11, zeolite L, zeolite ZSM-12, and zeolite ZSM-35.

28. The process defined in claim 24 wherein said halogen gas comprises fluorine and said support material comprises zeolite Y.

29. The process defined in claim 24 wherein said active metal component is selected from the group consisting of Group VIB and Group VIII metals.

30. The process defined in claim 24 wherein said hydrocarbon oil comprises a residuum feedstock or a vacuum gas oil.

31. The process defined in claim 24 wherein said support material further comprises a dispersion of silica-alumina in a matrix containing alumina.

32. The process defined in claim 24 wherein said conditions being such as to yield about a 15 to about a 35 volume percent conversion of said hydrocarbon oil boiling above 700° F. to hydrocarbon products boiling at or below 700° F.

33. A process for mild hydrocracking a hydrocarbon feedstock comprising a residuum oil or a gas oil, said process comprising contacting said feedstock under conditions of elevated temperature and pressure with a particulate catalyst comprising at least one active metal component on a support comprising a zeolite containing at least one non-hydrolyzable fluorine component, said conditions being such as to yield about a 15 to about a 35 volume percent conversion of said feedstock boiling above 700° F. to hydrocarbon products boiling at or below 700° F., and wherein said hydrocarbon products contain at least 85 volume percent of liquid hydrocarbon products boiling in the range from about 300° F. to about 700° F.

34. The process defined in claim 33 wherein said hydrocarbon feedstock contains sulfur and said process further comprising simultaneous desulfurization of said hydrocarbon feedstock.

35. The process defined in claim 33 wherein said hydrocarbon feedstock contains about 0.01 to about 1.0 weight percent nitrogen, calculated as N, and said process further comprises simultaneous denitrogenation of said hydrocarbon feedstock.

36. The process define in claim 33 wherein said hydrocarbon feedstock contains asphaltenes.

37. The process defined in claim 33 wherein said hydrocarbon feedstock contains less than about 25 ppmw of contaminant metals.

38. The process defined in claim 33 wherein said zeolite is selected from the group consisting of erionite, mordenite, zeolite Y, zeolite omega, zeolite beta, zeolite ZSM-5, zeolite ZSM-11, zeolite L, zeolite ZSM-12, and zeolite ZSM-35.

39. The process defined in claim 33 wherein said hydrocarbon feedstock comprises a vacuum gas oil and said conditions comprise a space velocity less than about 1.5 LHSV and a hydrogen partial pressure less than about 1200 p.s.i.g.

40. The process defined in claim 33 wherein said conditions comprise a temperature sufficient to yield greater than 25 volume percent conversion of said feedstock to hydrocarbon products boiling at or below 700° F.

41. The process defined in claim 33 wherein said support material further comprises a dispersion of silica-alumina in a matrix containing alumina.

42. The process defined in claim 41 wherein said support material comprises about 5 to about 95 weight percent of said zeolite, said dispersion of silica-alumina in an alumina matrix comprises between about 5 and about 75 weight percent of silica-alumina, and said active metal components are selected from the group consisting of cobalt, nickel, molybdenum and tungsten.

* * * * *

UNITED STATES PATENT AND TRADEMARK OFFICE
CERTIFICATE OF CORRECTION

PATENT NO. : 4,839,025
DATED : 06/13/89
INVENTOR(S) : John W. Ward

It is certified that error appears in the above-identified patent and that said Letters Patent is hereby corrected as shown below:

Col. 13, line 1, claim 3, delete "about" and insert -- above --.

Col. 13, line 10, claim 5, delete "ZSM12" and insert -- ZSM-12 --.

Signed and Sealed this

Tenth Day of July, 1990

Attest:

HARRY F. MANBECK, JR.

*Attesting Officer*   *Commissioner of Patents and Trademarks*